United States Patent [19]
Mercer et al.

[11] Patent Number: 5,899,315
[45] Date of Patent: May 4, 1999

[54] BISCUIT INVERTER MECHANISM

[75] Inventors: Michael John Mercer, Merseyside; Raymond Bell; Trevor Rowley, both of Newcastle, all of United Kingdom

[73] Assignee: Sasib Bakery UK Limited, United Kingdom

[21] Appl. No.: 08/842,690

[22] Filed: Apr. 15, 1997

[30]      Foreign Application Priority Data

Apr. 24, 1996  [GB]  United Kingdom ................... 9608607
Oct. 3, 1996   [GB]  United Kingdom ................... 9620712

[51] Int. Cl.⁶ ..................................................... B65G 47/24
[52] U.S. Cl. ........................... 198/374; 198/359; 198/360
[58] Field of Search ..................................... 198/403, 406, 198/402; 193/44, 45, 47, 48

[56]               References Cited

U.S. PATENT DOCUMENTS

| | | | |
|---|---|---|---|
| 1,576,338 | 3/1926 | Ladd | 198/406 |
| 4,114,524 | 9/1978 | Welch | 198/406 |
| 4,332,997 | 1/1982 | Dudko et al. | 193/47 |
| 4,410,177 | 10/1983 | Richardson | 193/47 |
| 5,630,496 | 5/1997 | Mims | 193/47 |

FOREIGN PATENT DOCUMENTS 0556656  8/1993  European Pat. Off. ........ A21C 15/02

*Primary Examiner*—William E. Terrell
*Assistant Examiner*—Khoi H. Tran
*Attorney, Agent, or Firm*—Baker & Maxham

[57]               ABSTRACT

A biscuit inverter mechanism comprising a pair of elongate, parallel, downwardly angled support members. The spaced parallel support members provide support for a biscuit when running thereover to enable that biscuit to be guided with a constant orientation through the mechanism. The support members also provide support for one side only of a biscuit when running thereover whereby the biscuit rotates under gravity to an inverted orientation before leaving the mechanism.

10 Claims, 3 Drawing Sheets

BISCUIT INVERTER MECHANISM

The present invention relates to the handling of biscuits, and similar items, and is concerned in particular with a mechanism for inverting selected ones in a line of biscuits moving along a conveyor.

There exist in the biscuit forming/packaging industry a number of situations where there is a requirement for selected ones of a plurality of biscuits travelling along a conveyor to be inverted but to then be permitted to continue along the original path so that some biscuits in the line are inverted while others are not. For example, where a filling is to be applied between an inverted biscuit and a non-inverted biscuit, it is required to produce a line of biscuits travelling along a conveyor with a constant separation between adjacent biscuits, wherein every other biscuit is inverted. This enables the filling to be applied to the inverted biscuit and then for the non-inverted biscuit to be lifted and placed onto the filling to complete the product, in the form of a biscuit/filling "sandwich".

The conventional method of inverting biscuits, which are being carried along a conveyor, involves flipping such biscuits over by means of a selectively pivotable flap over which the biscuits are arranged to run. This method has the disadvantage that the "flipped-over" biscuits tend to bounce when they land back on the conveyor with the result that they may settle at an unintended position and disrupt the smooth passage of the biscuit line. Also, the conventional technique places unsatisfactory constraints on the speed at which inversion can take place and hence on the throughput of biscuits per unit time.

It is an object of the present invention to provide a biscuit inverter mechanism which provides a smoother inversion of each biscuit and minimises the possibilities for biscuits to "bounce" on the supporting conveyor and disrupt the smooth passage of the biscuit line along the conveyor.

In accordance with the present invention in its broadest aspect, there is provided a biscuit inverter mechanism comprising a pair of laterally spaced, downwardly angled support members which normally serve to support and guide two opposite sides of a biscuit when travelling through the mechanism but which are relatively displaceable to a position closer together wherein the support for one side of a biscuit travelling thereover is removed so that such biscuit rotates about the other supported side to assume an inverted orientation.

In accordance with a second aspect of the present invention, there is provided a biscuit inverter mechanism comprising a pair of elongate, parallel, downwardly angled support members, one of which is transversely displaceable between a first position in which it is disposed parallel to but transversely displaced from the other support member such that the spaced parallel support members will provide support for two opposite sides of a biscuit when running thereover to enable that biscuit to be guided with a constant orientation through the mechanism, and a second position in which the movable support member is disposed parallel to but closer to the other support member, such that the support members then provide support for one side only of a biscuit when running thereover whereby the latter biscuit rotates under gravity about said one side to an inverted orientation before leaving the mechanism.

By "constant orientation" in the context, we mean that a biscuit remains with the same face (bottom face or top face) uppermost.

Preferably, the other of the two support members is fixed and only said one of the support members is displaceable.

Advantageously, the support members comprise straight metal or plastics rods, one of which rods is fixed and the other of which is connected to a crank mechanism by which it can be displaced laterally relative to the fixed rod.

Preferably, the support members are mounted within a generally U-shaped guide chute whose wall serves to ensure that, when the guide members are in the position resulting in rotation of a biscuit, the biscuit rotates only through 180° to said inverted orientation before being discharged from the mechanism.

Advantageously, biscuits placed onto the inverter mechanism from a first, upper conveyor and discharged from the support members when in their spaced apart condition are received by a second intermediate height conveyor before being discharged from the latter conveyor onto a third, lower conveyor, whereas biscuits allowed to rotate through 180° are discharged by said U-shaped chute directly onto said lower conveyor.

Preferably, a biscuit spacing device is disposed above the lower conveyor for momentarily arresting and aligning biscuits discharged onto this conveyor by the chute. Where there are multiple chutes, there would be a corresponding multiplicity of such spacing devices, preferably commonly driven.

Preferably, the speed of the intermediate conveyor is continuously variable, whereby biscuits discharged by the latter conveyor onto the lower conveyor can be arranged to be positioned accurately on the lower conveyor between inverted biscuits already travelling thereon which have been discharged by the U-shaped chute.

The invention is described further hereinafter, by way of example only, with reference to the accompanying drawings, in which.

Figure 1:
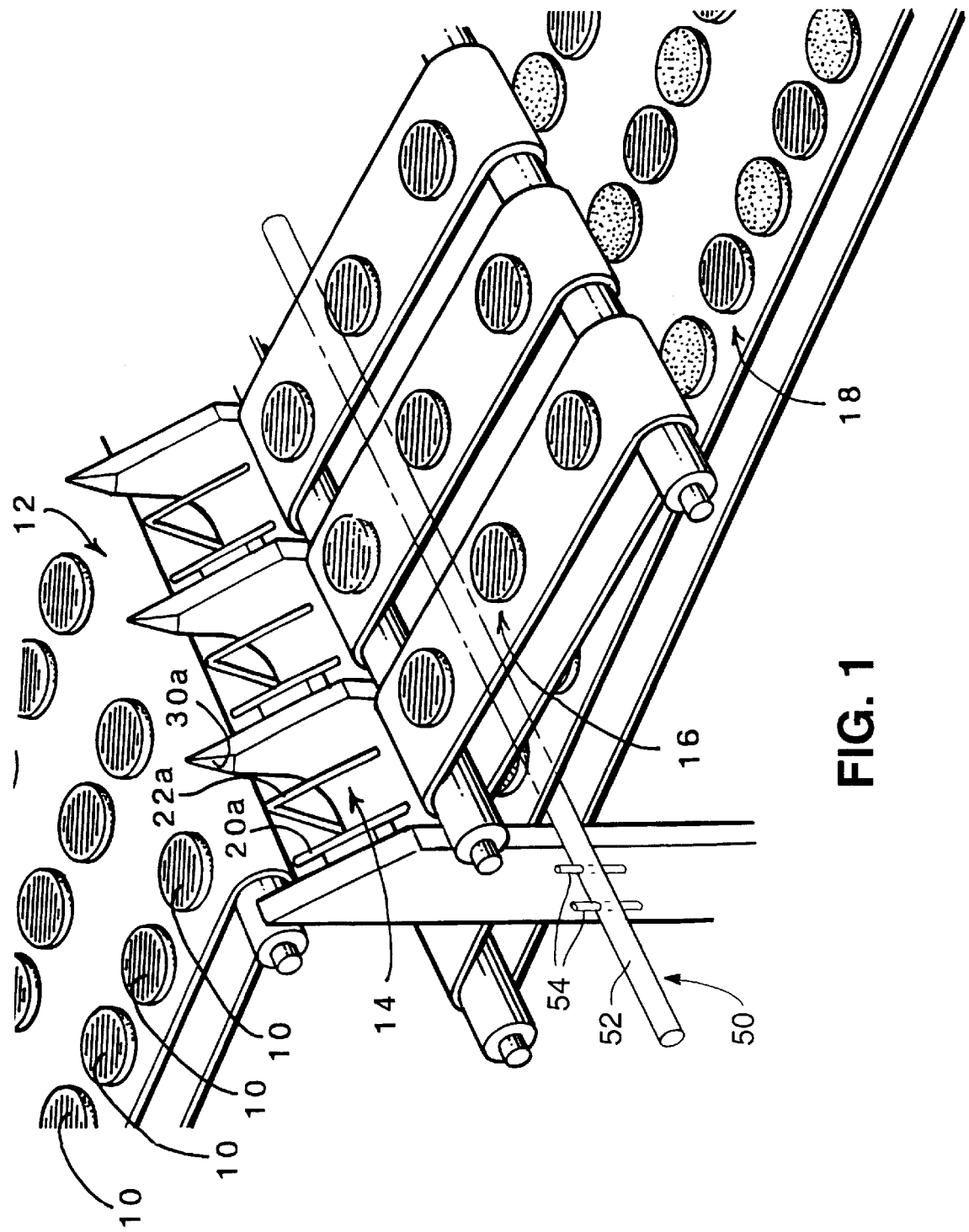
FIG. 1 is a perspective, diagrammatic view, from above of one embodiment of an apparatus in accordance with the present invention for inverting every other one of a plurality of biscuits moving along a conveyor.

Referring first to FIG. 1, there is shown part of a biscuit inverting apparatus in accordance with the invention viewed from above and one side. Although this Figure shows three lines of biscuits 10 progressing from left to right, in principle the apparatus could be designed to handle any number of such lines, depending inter alia upon the overall width available. To understand the operating principles involved it is, however, necessary to consider only one such line and this course is adopted in the following explanation.

The basic operation of this apparatus is that a linear line of biscuits 10, all disposed the same way up, are transported along a first, upper conveyor 12. The biscuits are spaced apart in the travelling direction by a uniform distance which is set by a conventional spacing device (not shown). All biscuits fall off the right-hand end of the conveyor onto a selective inverter mechanism 14 which can be controlled either to allow any particular biscuit 10 to pass onto a second, intermediate height, variable speed conveyor 16 and hence onto a third, lowermost conveyor 18, or can invert any particular biscuit 10 and present that biscuit in its inverted state directly to the third, lowermost conveyor 18, bypassing the intermediate conveyor 16.

The construction and operation of the inverter mechanisms 14 is shown in more detail in FIGS. 2a to 2c and FIG. 3 to which reference is now directed.

Figure 2A:
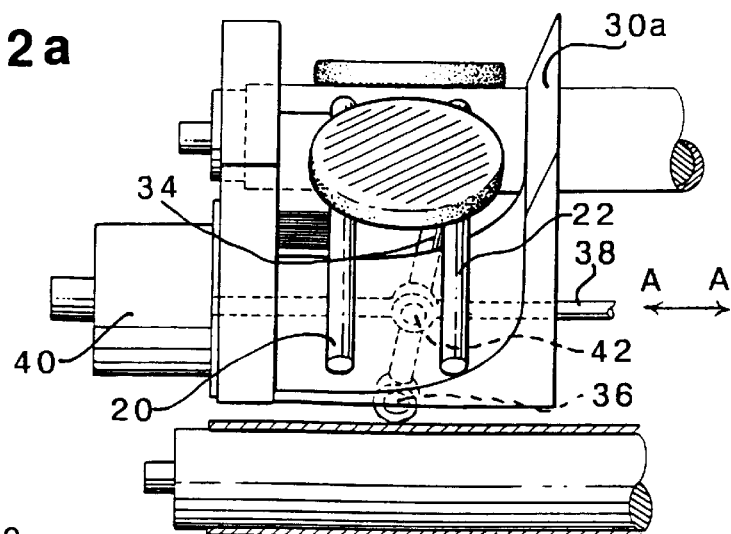
FIGS. 2a–2c are partial end views of one inverting mechanism illustrating the operation thereof to achieve biscuit inversion.

Each inverter mechanism 14 comprises a pair of parallel rods 20, 22, one of which 20 is fixed and the other of which 22 is laterally displaceable. As best seen in FIG. 3, the fixed rod 20 is rigidly mounted in a supporting block 24 attached to, or formed with, one upright side wall 26 of a generally U-shaped guide chute member 28 which has an opposite side wall 30 and base 32. The displaceable rod 22 is mounted so as to be selectively displaceable between a first (extended) position shown in FIG. 2a where it lies parallel to but laterally spaced from the fixed rod 20 by a distance somewhat less than the diameter of the particular biscuits 14 being handled, and a second (retracted) position shown in FIGS. 2b and 2c where it lies parallel to and closely adjacent (or touching) the fixed rod 20.

The displacement of the rod 22 between its first and second positions can be carried out by any suitable means. In the illustrated embodiment, this is achieved by forming the rod 22 as one arm of a generally L-shaped rod member 34 which is pivotally mounted to a fixed point at its distal end 36 and is also pivotally connected to a crank arm 38 which is arranged to be longitudinally reciprocated in a direction A—A, for example by means of a solenoid 40, servo motor or air actuator. Although not shown in the present Figures, the crank arm 38 is pivotally coupled to the respective displaceable rod 22 of each inverter mechanism 14 by a respective pivotal coupling 42 so that each or all of the displaceable rods 22 are moved in unison.

As best seen in FIG. 1, the rod members 20,22 are disposed at and below the discharge end of the conveyor 12 and at an angle to the horizontal so that each biscuit 14 which reaches the discharge end of the conveyor 12 drops smoothly onto the rods 20, 22. If when this happens the rod 22 is in the first (extended) position of FIG. 2a in which it is spaced apart from the fixed rod 20, the biscuit simply slides down the two rods and falls under gravity onto the intermediate conveyor 16 maintaining its original orientation (ie it is the same way up as it was on the conveyor 12). It is then carried forward to the discharge end of the conveyor 16, from where it falls smoothly onto the discharge conveyor 18, again with its original orientation.

Figure 2B:
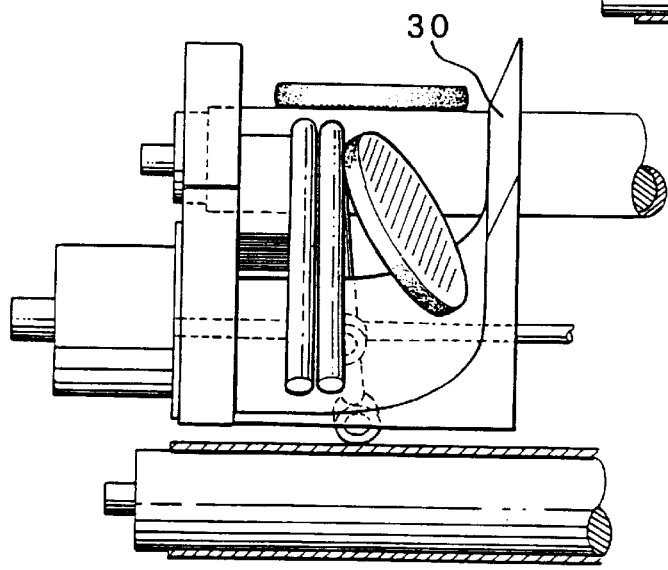
Figure 2C:
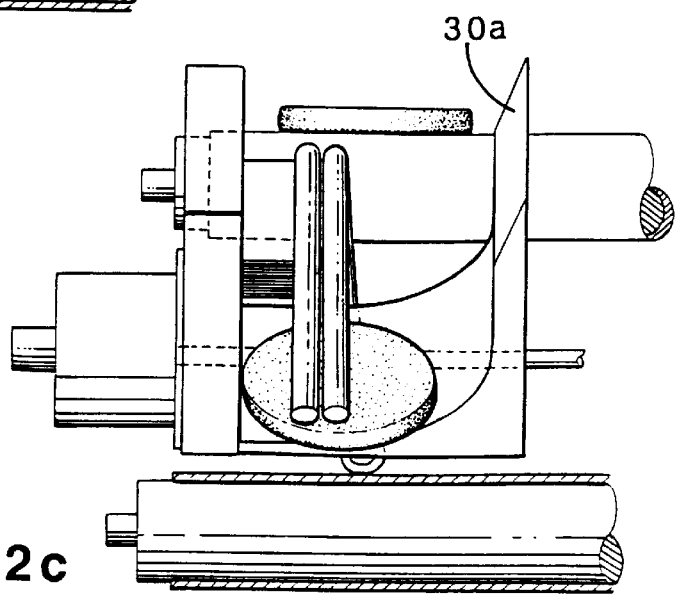
Figure 3:
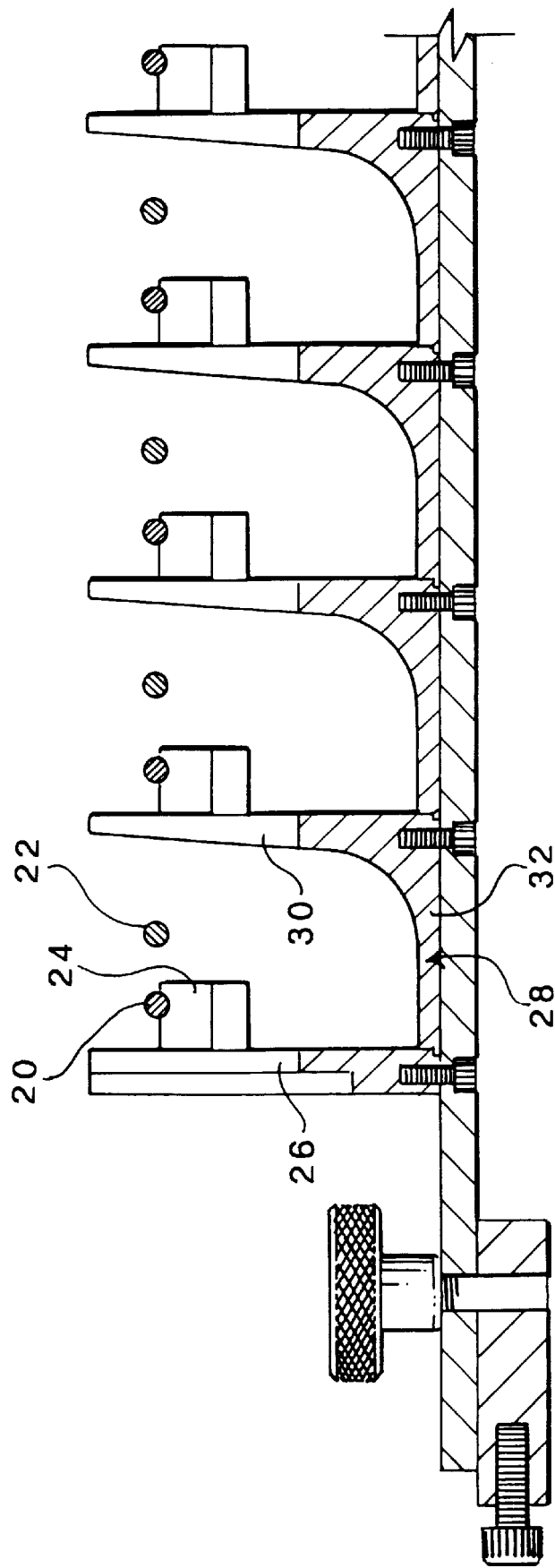
FIG. 3 is an end elevation of part of the apparatus to illustrate the shape of the biscuit chute and position of the mutually displaceable support rods.

On the other hand, if when the biscuit is discharged from the upper conveyor 12 the displaceable rod has been moved to its second (retracted) position shown in FIGS. 2b and 2c, the biscuit engages and slides down the rods 20,22 but is only supported by the rods at its one diametrical side during this movement; the opposite diametrical side of the biscuit is not engaged and supported by either rod and so falls relative to the side which is so engaged and supported. As a result, the biscuit starts to rotate about its supported side, as shown in FIG. 2b. The shape and disposition of the wall 30 and base 32 of the U-shaped chute 28 are arranged to be such that the laterally rotating biscuit is allowed to make a single half revolution, whereby it ends up on the base 32 in an inverted orientation relative to its initial state, as shown in FIG. 2c.

The preferred shape of the chute is best seen in the end elevation of FIG. 3. However, as evident from FIGS. 1 and 2a–2c, in its operational position its base 32 is inclined at substantially the same angle to the horizontal as the rods 20,22 whereby the biscuit is allowed to continue to fall under gravity along the inclined base 32 and to be discharged smoothly from the base 32 onto the conveyor 18, still in its inverted orientation.

In practice, the usual requirement is for every other biscuit from the original line on the conveyor 12 to be inverted so that the line of biscuits on the discharge conveyor, downstream of the intermediate conveyor 16, is such that alternate biscuits present a "top" face and a "bottom" face, respectively. This is achieved by arranging for the displaceable rod 22 to be moved between its two positions so that every other biscuit is allowed to rotate to an inverted state as shown in FIGS. 2b and 2c. By virtue of a displacement mechanism such as shown in FIGS. 2a–2c, this movement of the rod 22 between its first and second positions can be substantially instantaneous.

As shown in the drawings at 30a, the upper edge of the chute wall 30 is chamfered so as to assist in guiding the biscuits smoothly onto the rods 20,22 with minimal risk of collisions with this wall providing any significant impediment to the movement of the biscuits. The upper end regions 20a, 22a of the rods 20,22 which first engage the biscuits can also be chamfered for the same reason.

The speed of the intermediate conveyor is arranged to be continuously variable whereby the spacing of the biscuits travelling therealong can be varied so that the biscuits discharged by this conveyor to the lower conveyor 18 can be positioned accurately between the inverted biscuits already placed on this conveyor via the inverter mechanism. By this means, the individual biscuits in the line of inverted/non-inverted biscuits leaving the apparatus, on the conveyor 18 should all equally spaced apart in the travelling direction. However, it is found sometimes in practice that the biscuits being discharged from the chutes 28 still bounce a little when landing on the lower conveyor 18 so that the longitudinal spacing between successive biscuits can be variable and can depart from that intended. For this reason, it has been found to be preferable to incorporate a further spacing device 50 as shown in FIG. 1. This spacing device 50 can be of the same construction as the first mentioned spacing device located on the conveyor 12. In this embodiment, it comprises a shaft 52 which is rotatable about its longitudinal axis preferably driven and timed with the rotation of the first mentioned spacing device, and which carries a plurality of pairs of transversely extending laterally spaced indexing pins 54, one such pair being associated with each chute 28/line of biscuits, respectively. Thus, the pitch P between each adjacent pair of pins 54 corresponds to the pitch of the rows of biscuits across the machine. The rotational speed of the shaft 52 is timed, so that the pairs of pins 54 appropriately arrest and align each line of biscuits which have been turned over by the inverter mechanisms 14. This assists registration of the rows of inverted and non-inverted biscuits to be sufficiently accurate for subsequent depositing of cream/jam etc thereon.

A similar spacing device (not shown) is located on the conveyor 18 downstream of the location where the biscuits are deposited from the upper conveyor, for providing additional alignment/spacing of the biscuits.

Advantageously, the chute 28 is made of a very hard but low friction plastics material, such as a high density polyethylene (e.g. acetal).

Thus, there is provided by this invention a mechanism by which selected biscuits can be inverted, and placed smoothly and accurately onto a discharge conveyor without any significant "bouncing" of biscuits during inversion which could cause disruption of the process. This mechanism can therefore be used to achieve a significantly higher throughput of biscuits than biscuit handling systems using the conventional biscuit inverting mechanisms.

Where there are multiple lines of biscuits being handled, if a plurality of separate intermediate conveyors 16 are used, these can be commonly controlled at the same speed or can be separately controlled whereby their individual speeds may be different. In the case that speed variability between the various biscuit lines is not required, a single, wider conveyor could replace the plurality of individual conveyors 16.

The rods 20,22 are preferably made of a metal, such as steel, but could equally well be made of a rigid plastics material having suitable frictional characteristics.

We claim:

1. A mechanism for inverting at least one biscuit, comprising:

a pair of laterally spaced, downwardly angled support members which normally serve to support and guide two opposite sides of a first biscuit when traveling through the mechanism but which are relatively displaceable to a position closer together wherein the support for one side of a second biscuit traveling thereover is removed so that the second biscuit rotates about the other, supported side to assume an inverted orientation.

2. A mechanism according to claim 1, wherein the other of said two support members is fixed and only said one of said support members is displaceable.

3. A mechanism according to claim 1, wherein said support members comprise straight rods, one of which rods is fixed and the other of which is connected to a crank mechanism by which it can be displaced laterally relative to the fixed rod.

4. A mechanism according to claim 1, further comprising a generally U-shaped guide chute within which said support members are mounted, said guide chute having a wall which serves to ensure that, when the guide members are in the position resulting in rotation of the second biscuit, the second biscuit rotates only through 180 degrees to said inverted orientation before being discharged from the mechanism.

5. A mechanism according to claim 4, comprising a first upper conveyor, a third lower conveyor and a second intermediate height conveyor and wherein biscuits placed onto the inverter mechanism from said first upper conveyor and discharged from said support members when in their spaced apart condition are received by said second intermediate height conveyor before being discharged from the second intermediate height conveyor onto said third lower conveyor, whereas biscuits allowed to rotate through 180 degrees are discharged by said U-shaped chute directly onto said lower conveyor.

6. A mechanism according to claim 5, further comprising a biscuit spacing device disposed above said third, lower conveyor for momentarily arresting and aligning biscuits discharged onto the latter conveyor by the chute.

7. A mechanism according to claim 6, wherein there are multiple chutes, and a corresponding multiplicity of said biscuit spacing devices.

8. A mechanism according to claim 7, wherein said multiplicity of biscuit spacing devices are commonly driven.

9. A mechanism according to claim 5, having means by which the speed of the second intermediate height conveyor is continuously variable, whereby biscuits discharged by the second intermediate height conveyor onto the lower conveyor can be arranged to be positioned accurately on the lower conveyor between inverted biscuits already travelling thereon which have been discharged by the U-shaped chute.

10. A mechanism for inverting at least one biscuit, comprising:

a pair of elongate, parallel, downwardly angled support members, one of which is transversely displaceable between a first position in which it is disposed parallel to but transversely displaced from the other support member such that the spaced parallel support members will provide support for two opposite sides of a first biscuit when running thereover to enable the first biscuit to be guided with a constant orientation through the mechanism, and a second position in which the movable support member is disposed parallel to but closer to the other support member, such that the support members then provide support for one side only of a second biscuit when running thereover whereby the second biscuit rotates under gravity about said one side to an inverted orientation before leaving the mechanism.

* * * * *